(12) United States Patent
Wenger et al.

(10) Patent No.: US 11,319,074 B2
(45) Date of Patent: May 3, 2022

(54) EXTERNALLY REPLACEABLE FRICTION MECHANISM

(71) Applicant: B/E Aerospace, Inc., Winston-Salem, NC (US)

(72) Inventors: Brian P. Wenger, Kernersville, NC (US); Travis K. Finlay, Winston-Salem, NC (US)

(73) Assignee: B/E Aerospace, Inc., Winston-Salem, NC (US)

(*) Notice: Subject to any disclaimer, the term of this patent is extended or adjusted under 35 U.S.C. 154(b) by 433 days.

(21) Appl. No.: 16/363,040

(22) Filed: Mar. 25, 2019

(65) Prior Publication Data
US 2020/0307805 A1   Oct. 1, 2020

(51) Int. Cl.
*B64D 11/06*   (2006.01)
(52) U.S. Cl.
CPC .................. *B64D 11/0644* (2014.12)
(58) Field of Classification Search
CPC .................................................. B64D 11/0644
See application file for complete search history.

(56) References Cited

U.S. PATENT DOCUMENTS

| | | | | |
|---|---|---|---|---|
| 4,586,750 | A * | 5/1986 | Vogel | A47C 7/543 |
| | | | | 297/411.32 |
| 8,534,761 | B2 * | 9/2013 | Saxton | B60N 2/753 |
| | | | | 297/411.32 |
| 9,321,381 | B2 | 4/2016 | Itzinger | |
| 10,017,256 | B2 | 7/2018 | Byers et al. | |
| 10,953,777 | B1 * | 3/2021 | Rathore | A47C 7/543 |
| 2009/0309407 | A1 * | 12/2009 | Saito | B60N 2/757 |
| | | | | 297/411.32 |
| 2015/0267757 | A1 * | 9/2015 | Garing | B64D 11/064 |
| | | | | 188/67 |
| 2019/0301243 | A1 * | 10/2019 | Huang | E06C 7/006 |
| 2020/0047651 | A1 * | 2/2020 | Faccin | B60N 2/753 |

* cited by examiner

*Primary Examiner* — Justin M Benedik
(74) *Attorney, Agent, or Firm* — Suiter Swantz pc llo

(57) ABSTRACT

An externally replaceable friction mechanism for a pivoting assembly such as an armrest assembly, the friction mechanism including a first spacer configured to non-rotationally engage a fixed element and frictionally engage a pivoting element pivotable relative to the fixed element, a first friction ring configured to non-rotationally engage the first spacer, the first friction ring including fingers configured to frictionally engage the pivoting element, and wherein the first friction ring is configured to permit pivoting movement of the pivoting element relative to the fixed element and provide friction against the pivoting movement.

14 Claims, 7 Drawing Sheets

EXTERNALLY REPLACEABLE FRICTION MECHANISM

BACKGROUND

Vehicle seats such as aircraft passenger seats are commonly equipped with amenities such as armrests, tray tables, leg rests, and seat backs that are adjustable for passenger comfort and/or personnel use. Luggage bins and other storage arrangements for use by either passengers or crew have hinged doors and various other parts that move by partial or full relative rotation. The components that facilitate the adjustability of such assemblies and arrangements are expected to provide long service lives.

Moving elements that are subject to more frequent use are exposed to higher wear and even abuse. The pivoting armrests of airline passenger seats, for example, are likely handled and adjusted several times by every passenger that uses a particular seat. An armrest may be raised and lowered for courtesy each time another passenger using a nearby seat enters and exits a seating row. A typical armrest pivots about single mounting point in a cantilever fashion. The expectation that an armrest maintain any position once adjusted by a passenger is typically met by a pivoting joint that applies an appropriate amount of friction to permit adjustment and assure stability.

Such armrests and other mechanical systems ultimately require maintenance and repair, particularly in components where friction and movement occur and thus wear tends to accumulate. As wear occurs in the pivoting joints of armrests and other mechanical systems, it is undesirable to replace an entire passenger seat, luggage bin, or other major assembly or even disassemble such an assembly to any great extent. Airline operators, in particular, prefer to conduct maintenance and repair operations with as little interruption to aircraft use as feasible.

Any mounting and pivoting mechanism that attaches a pivoting element to a more fixed host structure, and that applies friction against relative movement, is likely to require maintenance and repair. It is preferable to minimize the costs of replacement parts and the required skill level for repair operations, while at once assuring a repaired mechanism is returned to an expected performance level once a maintenance operation is complete.

SUMMARY OF THE INVENTIVE ASPECTS

To achieve the foregoing and other advantages, the inventive aspects disclosed herein are directed to an externally replaceable friction mechanism, in which a first spacer is configured to non-rotationally engage a fixed element such as a seat frame element and frictionally engage a pivoting element such as an armrest. A first friction ring is configured to non-rotationally engage the first spacer, the first friction ring including fingers configured to frictionally engage the pivoting element. The first friction ring is configured to permit pivoting movement of the pivoting element relative to the fixed element and provide friction against the pivoting movement.

In some embodiments, the friction mechanism may further include a first cap configured to non-rotationally engage the armrest and frictionally engage the first friction ring, wherein the first friction ring is configured to permit pivoting movement of the first cap with the armrest.

In some embodiments, the first spacer may include a flange that is substantially perpendicular to an axis about which the first friction ring is configured to permit pivoting movement of the armrest relative to the seat frame, the flange configured to frictionally engage the armrest.

In some embodiments, the first spacer may include a neck connected to the flange, the neck having an exterior for non-rotationally engaging the frame and an interior surrounding the axis for non-rotationally engaging the first friction ring.

In some embodiments, the neck may extend as a hexagonal wall having exterior facets to non-rotationally engage the frame and having interior facets to non-rotationally engage the first friction ring.

In some embodiments, the first friction ring may include a body extending along an axis about which the first friction ring is configured to permit pivoting movement of the armrest relative to the seat frame, the body including a hexagonal first end for non-rotationally engaging the first spacer, the hexagonal first end extending beyond the fingers, and a second end opposite the first end, the second end overlapped by at least one of the fingers.

In some embodiments, the fingers may include multiple first fingers each inclined toward the first end and multiple second fingers inclined toward the second end.

In some embodiments, the first fingers and the second fingers may be alternatingly spaced at regular angular intervals around the axis.

In some embodiments, the first fingers and the second fingers may be connected to an exterior of the body along a circumferential path around the exterior of the body.

In some embodiments, the friction mechanism may further include a second spacer configured to non-rotationally engage the seat frame and frictionally engage the armrest, and a second friction ring configured to non-rotationally engage the second spacer, the second friction ring including fingers configured to frictionally engage the armrest.

In some embodiments, the first spacer may include a first flange and a hexagonal first neck connected to the first flange, the first neck extending toward the second spacer, the second spacer may include a second flange and a hexagonal second neck connected to the second flange, the second neck extending toward the first spacer, the first friction ring may have a hexagonal first end for non-rotationally engaging an interior of the hexagonal first neck, and the second friction ring may have a hexagonal second end for non-rotationally engaging an interior of the hexagonal second neck.

In some embodiments, the first spacer and the second spacer may be symmetrically positioned and oriented relative to each other about a center plane, and the first friction ring and the second friction ring may be symmetrically positioned and oriented relative to each other about the center plane.

Another inventive aspect disclosed herein is directed to an armrest assembly including a seat frame element, an armrest pivotally connected to the seat frame element, and a friction mechanism pivotally connecting the armrest to the seat frame element, the friction mechanism including a first friction ring in non-rotational engagement with the seat frame element, the first friction ring having deformable fingers frictionally engaging the armrest and permitting pivoting movement of the armrest relative to the seat frame element.

In some embodiments, the friction mechanism may further include a spacer in non-rotational engagement with the seat frame, the spacer including a flange that is substantially perpendicular to an axis about which the armrest is pivotable relative to the seat frame.

In some embodiments, the spacer may further include a neck connected to the flange, the neck surrounding the axis and non-rotationally engaging the frame.

In some embodiments, the first friction ring may be in non-rotational engagement with the seat frame via the spacer.

In some embodiments, the fingers may frictionally engage a circular interior wall of a hole defined in the armrest.

A further inventive aspect disclosed herein is directed to a kit of parts for servicing a friction mechanism pivotally connecting an armrest to a seat frame, the kit including at least two friction rings, wherein each friction ring includes a body extending along an axis about which the friction ring is configured to permit pivoting movement of the armrest relative to the seat frame, the body having a hexagonal first end and an opposing second end, multiple first fingers for frictionally engaging the armrest, each first finger connected to an exterior of the body and inclined toward the first end, the first end extending beyond the first fingers, and multiple second fingers for frictionally engaging the armrest, each second finger connected to the exterior of the body inclined toward the second end, the second end overlapped by the second fingers, wherein the first fingers and second fingers are alternatingly connected to the exterior of the body along a circumferential path around the exterior of the body.

In some embodiments, the kit of parts further includes multiple spacers, wherein each spacer includes a first flange for frictionally engaging the armrest, and a hexagonal neck connected to the first flange, the neck having an exterior for non-rotationally engaging the frame and an interior for non-rotationally engaging the first end of one of said at least two friction rings.

In some embodiments, the friction mechanism includes a first side, a second side, and a bolt connecting the first side and second side together, the kit further comprising a tool configured to turn the bolt for use in servicing the friction mechanism.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

A friction mechanism for use in a pivoting joint is described in the following with reference to the drawings. The friction mechanism can advantageously isolate the structures that are least replaceable from relative movement in a pivoting joint to facilitate cost and time efficient servicing. The friction mechanism can be replaced with a same or similar mechanism quickly and with few tools. The friction mechanism can be serviced by replacement of one or more parts. The replacement of the below-described friction rings is particularly expected to return the performance of the friction mechanism to an engineered resistance to movement. The friction rings can be replaced without dismounting a pivoting element from a host structure.

The friction mechanism can be used in a pivoting joint between a tray table and a supporting leg, between a leg rest and a seat frame component, and between the door of a storage bin and a frame member at the edge of the bin, among other applications. Many host structures and pivoting elements with which the friction mechanism can be used are within the full scope of these descriptions. The following describes the assembly and use of the friction mechanism at the pivoting joint of a passenger seat frame element and an armrest as a non-limiting example.

Figure 1:
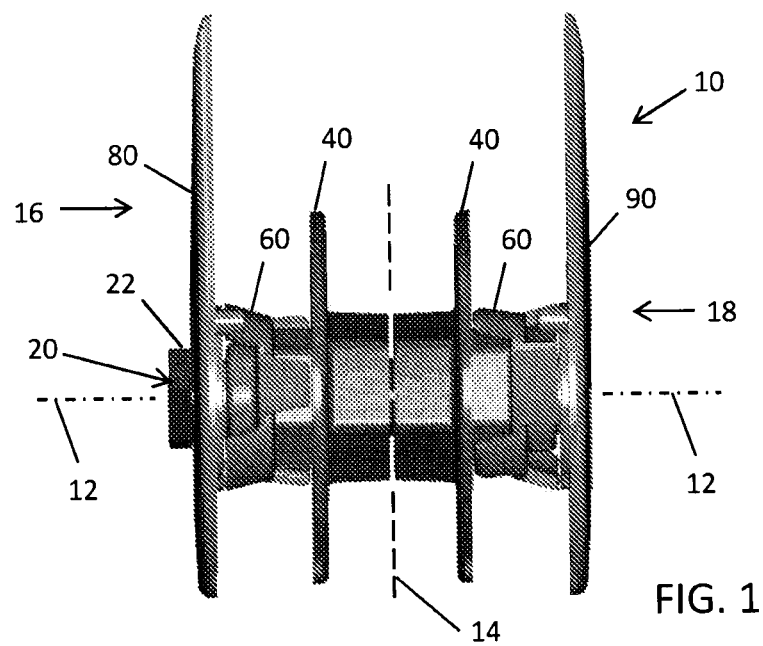
FIG. 1 is a top view of a friction mechanism, according to the present disclosure, for use in a pivoting joint.

Referring to FIG. 1, a non-limiting example of a friction mechanism is shown generally at reference numeral 10. The components of the friction mechanism 10 are aligned along a longitudinal axis 12, which defines a rotational axis around which relative movement occurs in a pivoting joint facilitated by the friction mechanism 10. While each component of the friction mechanism 10 could be described as having a separate axis, the longitudinal axis 12 is referenced in several of the other drawings for convenience, with the understanding that the respective axes of the components of the friction mechanism are aligned upon assembly. Thus, the longitudinal axis 12 serves as a reference line in these descriptions. Terms such as radially outward refer to features directed away from the longitudinal axis 12. Terms such as circumferential refer to features spaced or extended around the longitudinal axis 12.

Figure 2:
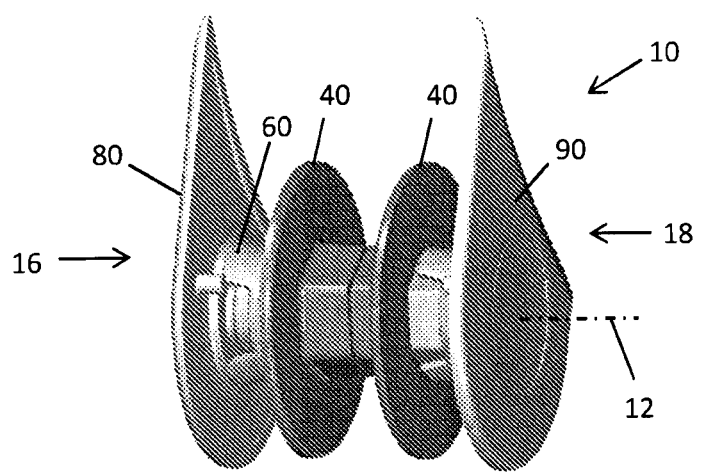
FIG. 2 is a perspective view of the friction mechanism of FIG. 1.

FIG. 2 shows the friction mechanism 10 in a perspective view to further illustrate features. While some symmetry is seen across a center plane 14 (FIG. 1), defined as perpendicular to the longitudinal axis 12, the secure assembly of the friction mechanism 10 is maintained by a bolt inserted into a first side 16 of the friction mechanism 10 toward a second side 18 thereof. The bolt 20 is further shown also in FIG. 8 inserted through certain first side components of the friction mechanism. In the assembled friction mechanism 10, the head 22 of the bolt is accessible at the first side 16 for securing the assembly, such that a single tool can be used to assemble and disassemble the friction mechanism.

Figure 3:
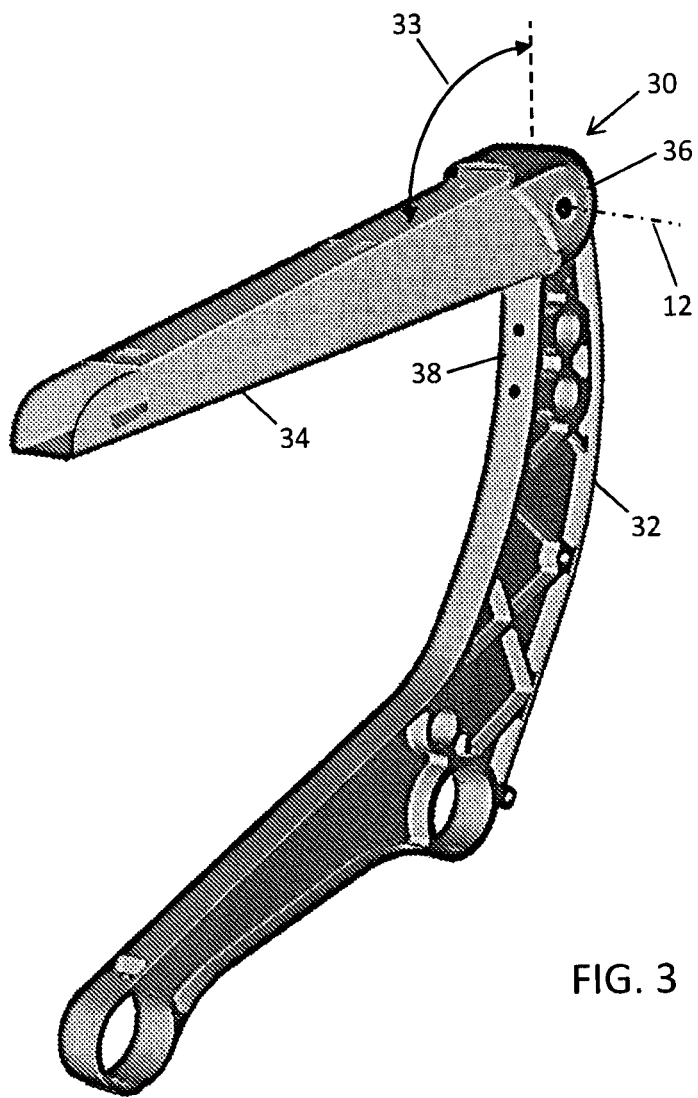
FIG. 3 is a perspective view of an aircraft seat spreader and pivoting armrest in which the friction mechanism of FIG. 1 is used.

FIG. 3 shows the friction mechanism 10 installed at the pivoting joint 30 of a host structure and a pivoting element. In the illustrated example, the host structure is a fixed element shown as an aircraft seat frame element referenced as a spreader 32, and the pivoting element is shown as an armrest 34. In this in-use example, the friction mechanism 10 permits the position of the armrest 34 to be smoothly adjusted by pivoting at the axis 12. The rearward end 36 of the armrest 34 is pivotally mounted to an upper end 38 of the spreader 32. At the pivoting joint 30, the friction mechanism 10 provides fiction to maintain the position, within the available range 33, of the armrest 34 relative to the spreader 32. For example, upon raising the arm rest 34 to a vertical position, the armrest should not return to a lower position even under turbulent conditions of air travel. Even partially-raised positions should be maintained, once assumed, to leave the armrest 34 in any condition preferred by a passenger or other cabin inhabitant.

The armrest 34 in full assembly and use would likely have an additional pad or other covering for passenger comfort. The spreader 32 in use would likely be supported by legs or beams connected directly or indirectly to the floor or other fixed structure of a passenger vehicle such as an aircraft. Other components of a passenger seat or seating row, such as a seat pan and a backrest, are not illustrated to permit view of inventive features and benefits.

Returning to FIG. 1, inward at the center plane 14, FIG. 1 shows a pair of oppositely oriented and symmetrically arranged spacers 40. Further outward from the center plane, engaged with the spacers 40, FIG. 1 shows a pair of oppositely oriented and symmetrically arranged friction rings 60. These interior components of the friction mechanism 10 are engaged with the spreader 32 without relative movement when the armrest 34 is pivotally adjusted. Thus, the spreader 32 is isolated from movement and wear as the armrest 34 pivots.

Figure 4:
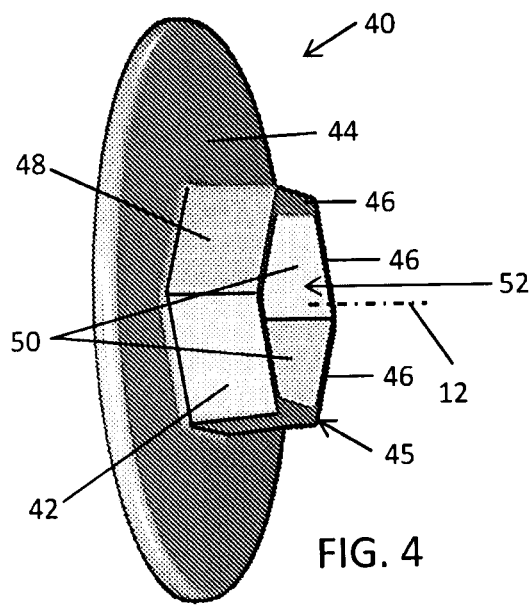
FIG. 4 is a perspective view of a spacer of the friction mechanism of FIG. 1.

As the spacers 40 in FIG. 1 are substantially similar, differing from each other when installed optionally only by their orientation, a single description of a spacer 40 is sufficient. As shown in FIG. 4, each spacer 40 has a longitudinally extending neck 42 and a radially extending, approximately annular, flange 44 connected to the neck 42. The neck 42 has an insertion end 45 directed away from the flange 44. The neck 42 has uniform profile along the longitudinal axis 12, facilitating smooth insertion into a mounting hole of the spreader 32 of FIG. 3. The flange 44 is substantially planar and perpendicular to the longitudinal axis 12. When assembled with the friction mechanism 10, the flange 44 is substantially parallel to the center plane 14.

The neck 42 extends longitudinally as a wall having planar wall sections 46, together circumferentially surrounding the longitudinal axis 12, to non-rotationally engage a correspondingly shaped mounting hole of a host structure such as the spreader 32. The planar wall sections 46 have radially outward exterior facets 48, facing away from the longitudinal axis 12, for non-rotationally engaging the host structure. The planar wall sections 46 have radially inward interior facets 50, each facing the longitudinal axis 12 and into an open channel interior 52 of the neck 42. The interior facets 50 non-rotationally engage the friction ring 60 when in use. In the illustrated example, the neck 42 is shown extending as a hexagonal wall having a hexagonal profile by having six wall sections. Other shapes for the faceted wall of the neck 42 profiles are within the scope of these descriptions.

Figure 5:
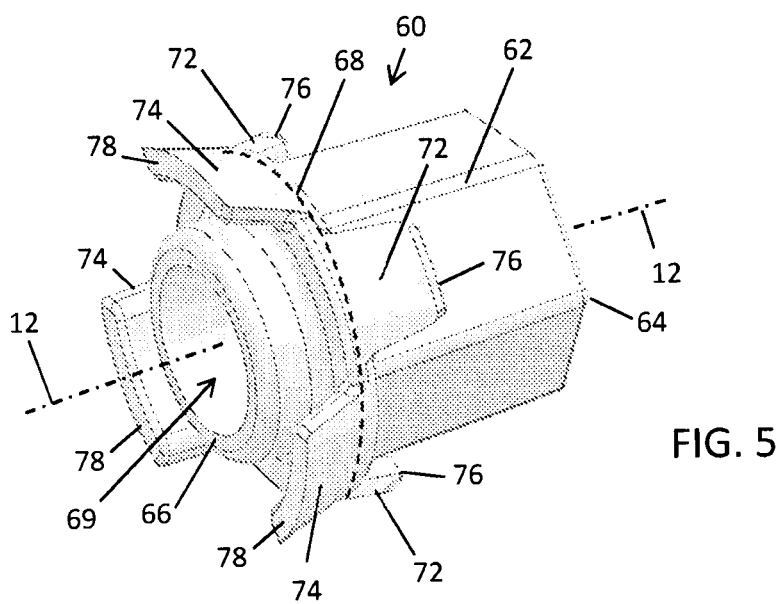
FIG. 5 is a perspective view of a friction ring of the friction mechanism of FIG. 1.

As the friction rings 60 in FIG. 1 are also substantially similar, differing from each other when installed optionally only by their orientation, a single description of a friction ring 60 is sufficient. As shown in FIG. 5, each friction ring 60 has a longitudinally extending body 62, a first end 64 of which defines the insertion end of the friction ring 60. A second end 66 of the longitudinally extending body 62 defines an access end of the friction ring 10. The friction ring 60 is to be inserted into the aligned holes of a host structure and a pivoting element, such as the seat spreader and arm rest of FIG. 3, with the first end 64 directed inward and the second end 66 directed outward. A central hole 69 extends longitudinally through the body 62 of the friction ring 60, and through the first end 64 and second end 66. The central hole 69 has smooth circular cylindrical interior wall to receive a bushing mounted on the bolt 20.

The friction ring 60 includes first fingers 72 connected to the exterior of the body 62. The first fingers 72 are circumferentially spaced at regular angular intervals around the longitudinal axis 12 of the friction ring 60. Before the friction ring 60 is inserted into a pivoting joint for use, each first finger 72 extends, at an angle inclining toward the insertion end of the friction ring, radially outward from the exterior of the body 62 and longitudinally toward the first end 64.

The friction ring 60 includes second fingers 74 connected to the exterior of the body 62. The second fingers 74 are circumferentially spaced at regular angular intervals around the longitudinal axis 12 between the first fingers 72 such that each first finger 72 has two second fingers 74 as angularly adjacent nearest neighbors. That is, in proceeding circumferentially around the body 62, the first fingers 72 and second fingers 74 are connected to the body 62 in a staggered or alternating arrangement. Before the friction ring 60 is inserted into a pivoting joint for use, each second finger 74 extends, at an angle inclining toward the access end of the friction ring 60, radially outward from the exterior of the body 62 and longitudinally toward the second end 66.

Thus, the first fingers 72 and second fingers 74 extend at their respective angles radially outward before insertion. However, the first fingers 72 and second fingers 74 extend, at their respective angles, in longitudinally opposite directions. In the illustrated embodiment of the friction ring 60, the first fingers 72 and second fingers 74 are connected to the exterior of the body 62 at approximately equivalent longitudinal positions, along a circumferential path 68 around the exterior of the body 62, with respect to the longitudinal axis 12. In other embodiments, the first and second fingers 72 and 74 may be connected at different positions with respect to the longitudinal axis 12. The first fingers 72 and second fingers 74 are connected to the exterior of the body 62 more proximal the second end 66 than the first end 64. This facilitates the first end 64 of the body 62 extending longitudinally beyond outward terminal ends 76 of the first fingers 72. In the illustrated embodiment, the second end 66 of the body 62 does not extend longitudinally substantially beyond outward terminal ends 78 of the second fingers 74, such the that second fingers 74 overlap the second end 66 of the body 62.

Figure 13:
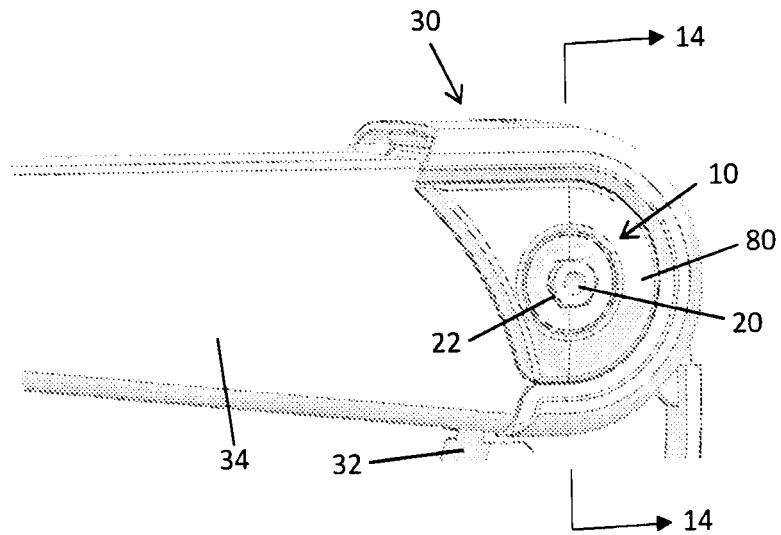
FIG. 13 is a perspective view as in FIG. 12, shown with a cap and bolt securing the assembled pivoting joint.

These descriptions refer to the forms of the first fingers 72 and second fingers 74 before insertion to describe their initial form prior to first use and deformation. Upon insertion of the friction ring 60 into the aligned holes of a host structure and pivoting element, the first fingers 72 and second fingers 74 are expected to conform by deformation to a confined space, as shown in FIG. 13. Thus, for example when an armrest is pivotally attached to a seat spreader, the friction ring 60 provides ample friction to the pivoting joint to prevent spurious unwanted movements while permitting the position of the armrest to be pivotally adjusted when desired. The first end 64 of the of the body 62, which extends beyond the longitudinal ends 76 of the first fingers 72, is inserted into the interior 52 of a spacer 40 (FIG. 4) when assembling the friction mechanism 10.

Returning to FIG. 1, continuing outward from the friction rings 60 along the longitudinal axis 12, a first cap 80 at the first side 16 of the friction mechanism 10, and a second cap 90 at the second side 18, retain the respective friction rings 60. While the first cap 80 and second cap 90 bear some symmetric similarities in the illustrated embodiments, their differences are also apparent both in the drawings and in the following separate descriptions.

Figure 6:
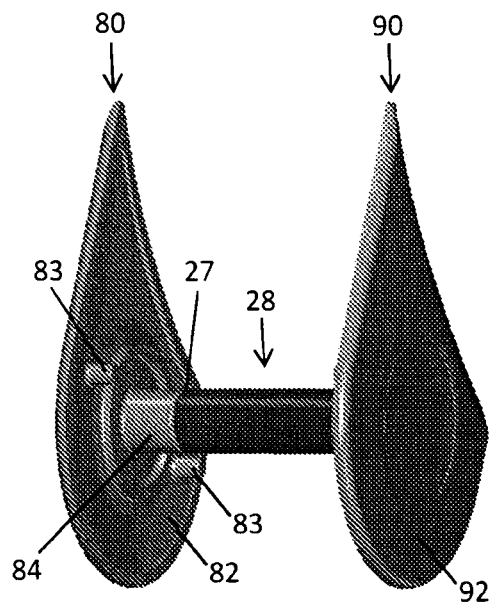
FIG. 6 is a perspective view of the caps and bushing of the friction mechanism of FIG. 1.
Figure 8:
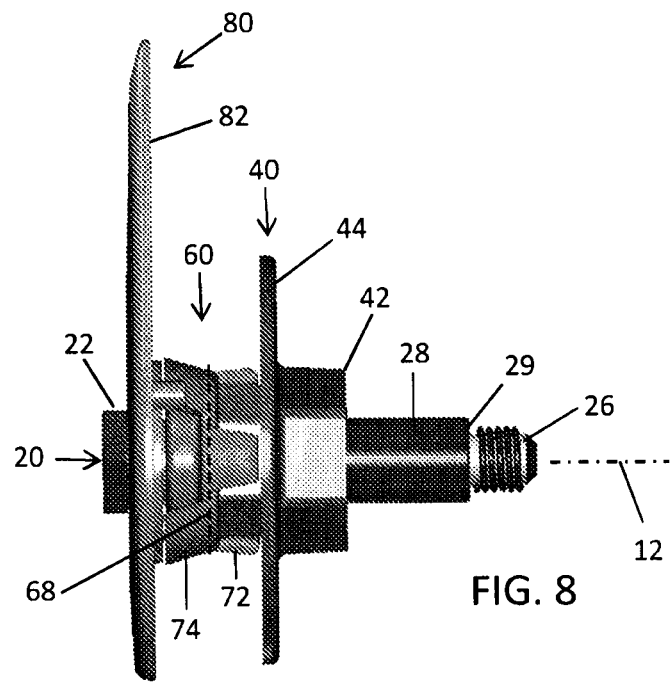
FIG. 8 is a top view of a cap, friction ring, spacer, bushing, and bolt assembled together without other components of the friction mechanism of FIG. 1.

As shown in FIG. 6, the first cap 80 includes a plate 82 and a collar 84 extending longitudinally from the plate 82. When assembled with the friction mechanism 10, the plate 82 is generally parallel to the center plane 14. A hole 86 extends longitudinally through plate 82 and collar 84 of the first cap 80 to permit the shank of the bolt 20 with the head 22 abutting the outward face 88 of the plate 82 as shown in FIG. 8. Two posts 83 extend longitudinally from the plate 82 on opposing sides of the collar 84. In assembly, the posts 83 are received in corresponding registration holes in a pivoting element, as further described in the following with reference to FIGS. 12 and 13, to register the relative position of the plate 82 and assure non-rotational engagement.

Figure 7:
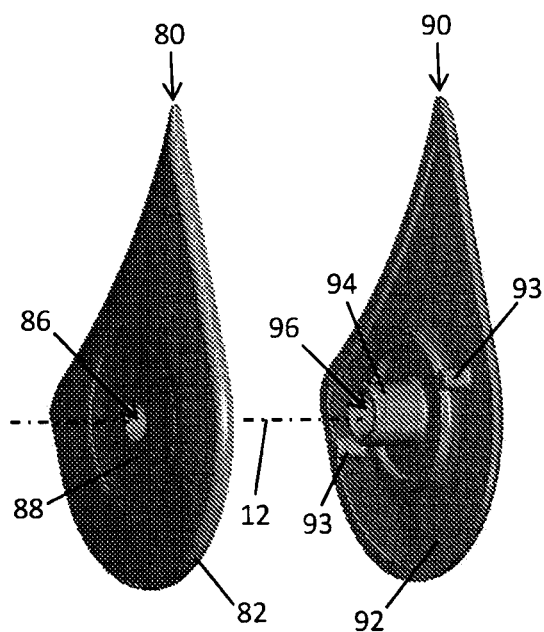
FIG. 7 is another view of the caps of FIG. 7 taken from another perspective.

As shown in FIG. 7, the second cap 90 includes a plate 92 and a collar 94 extending longitudinally from the plate 92. When assembled with the friction mechanism 10, the plate 92 is generally parallel to the center plane 14. A hole 96 extends longitudinally into the collar 94 without passing through the plate 92 in the illustrated embodiment. The hole 96 is internally threaded to retain the threaded end 26 (FIG. 8) of the bolt 20 when the friction mechanism 10 is assembled. Two posts 93 extend longitudinally from the plate 92 on opposing sides of the collar 94. In assembly, the posts 93 are received in corresponding registration holes in a pivoting element, similarly as described in the following with reference to the first cap 80 and FIGS. 12 and 13, to register the relative position of the plate 92 and assure non-rotational engagement.

Figure 14:
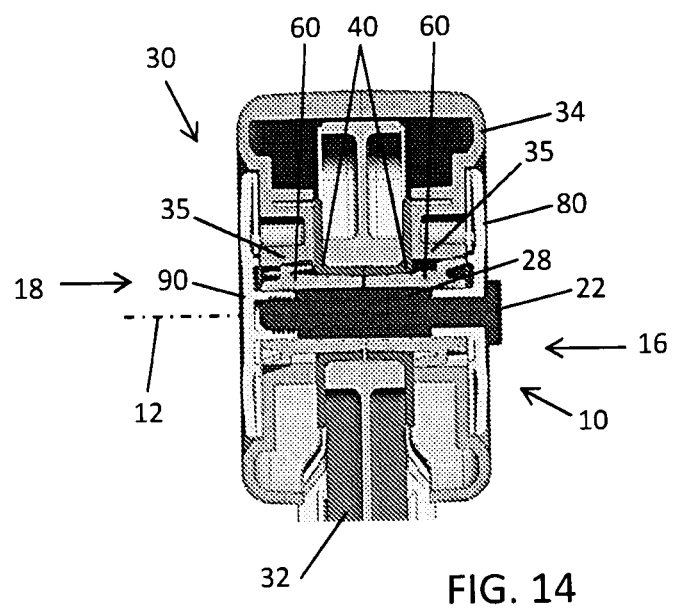
FIG. 14 is a cross-sectional view taken along the line 14-14 in FIG. 13.

FIG. 8 shows the first cap 80, first-side friction ring 60, first-side spacer 40, and a bushing 28 mounted onto the bolt 20. The bushing 28 is illustrated as a longitudinally extending circular cylinder. In the assembled condition of the friction mechanism 10 (FIG. 1): a first longitudinal end 27 (FIG. 6) of the bushing 28 is received within the first-side spacer 40 as shown in FIGS. 8 and 14; the first end of the of the first-side friction ring 60 is received within the open channel interior 52 (FIG. 4) of the neck 42 of the first-side spacer 40; and the threaded end 26 (FIG. 8) of the bolt 20 extends from the second longitudinal end 29 of the bushing 28 to be retained by the collar 94 of the second cap 90 (FIG. 7). Similar descriptions are implied with regard to the bushing 28 and the second-side spacer 40 and second-side friction ring 60 (FIG. 1). First-side and second-side terms here refer to the nominal first side 16 and opposite nominal second side 18 of the friction mechanism 10 as referenced in FIG. 1.

Figure 9:
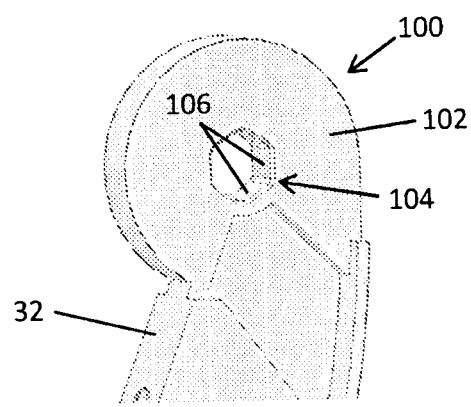
FIG. 9 is a perspective view of the upper end of the spreader of FIG. 3.

Benefits and additional features of the friction mechanism 10 will be further understood in consideration of FIGS. 9-13, which illustrate the installation of the friction mechanism 10 between a host structure illustrated as a seat spreader and a pivoting element illustrated as an armrest. FIG. 9 shows the upper end 100 of the spreader 32 of FIG. 3, shown without an armrest or any component of the friction mechanism 10. The upper end of the spreader 32 has a mounting plate 102 shaped as a partial disk. A hole 104 is defined through the mounting plate 102 at the approximate center of the partial disk. In an assembled pivoting joint 30 (FIG. 3), the longitudinal axis 12 passes through the mounting hole 104.

Figure 10:
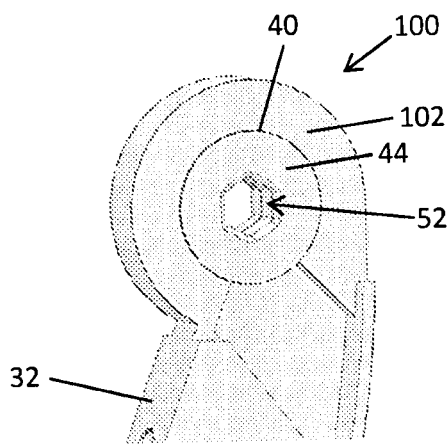
FIG. 10 is a perspective view of the spreader of FIG. 9, showing the spacer of FIG. 4 inserted.

Installation of the friction mechanism 10 proceeds with the insertion end 45 (FIG. 4) of the spacer 40 inserted into the mounting hole 104 with the flange 44 contacting the mounting plate 102 at full insertion as shown in FIG. 10. The mounting hole 104 is shaped to non-rotationally engage the neck 42 of the spacer 40. In the illustrated embodiment, the neck 42 (FIG. 4) has exterior facets 48. Accordingly, the mounting hole 104 (FIG. 9) is illustrated as having interior facets 106 for engaging the exterior facets 48 of the neck 42. In particular, the neck 42 and mounting hole 104 are each illustrated as hexagonal, such that there are six interior facets 106 within the mounting hole 104 and six corresponding exterior facets 48 for non-rotational engagement of the spacer 40 and mounting plate 102. Other mutually corresponding shapes for the mounting hole 104 and the neck 42 of the spacer 40 are within the scope of these descriptions. A spacer 40 as shown in FIG. 10 is to be inserted on each side of the mounting plate 102, such that two spacers 40 are installed for assembly of the friction mechanism 10 (FIG. 1).

Figure 11:
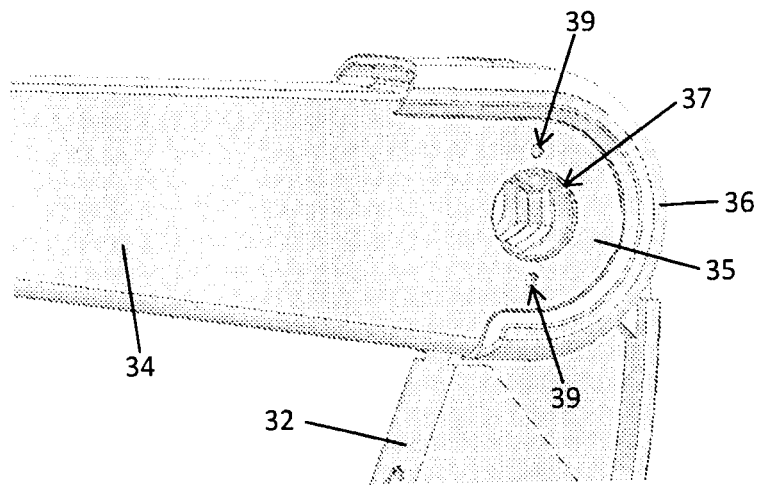
FIG. 11 is a perspective view as in FIG. 10, showing an armrest placed upon the spreader for assembly of a pivoting joint.

After insertion of the spacers 40, installation further proceeds as shown in FIG. 11 with the armrest 24 mounted onto the mounting plate at the upper end 100 of the spreader 32 as shown in FIG. 11. Each side of the rearward end 36 of the armrest 34 has a pivot block 35 that frictionally engages and covers flange of the installed spacer. The mounting plate 102 (FIGS. 9-10) is positioned between the pivot blocks 35 when the armrest 34 is placed onto the spreader 32. Aligned holes 37 defined through the pivot blocks 35, one of which is shown in FIG. 11, aligns with the mounting hole 104 (FIG. 9) of the spreader and with the interior 52 of the spacer 40 (FIG. 10), each of which aligns with the longitudinal axis 12 in an assembled pivoting joint 30 (FIG. 3). Although a single side of the installation is illustrated in FIGS. 10-13, an installed spacer is understood as covered by a corresponding pivot block 35 at the other side of the installation.

Figure 12:
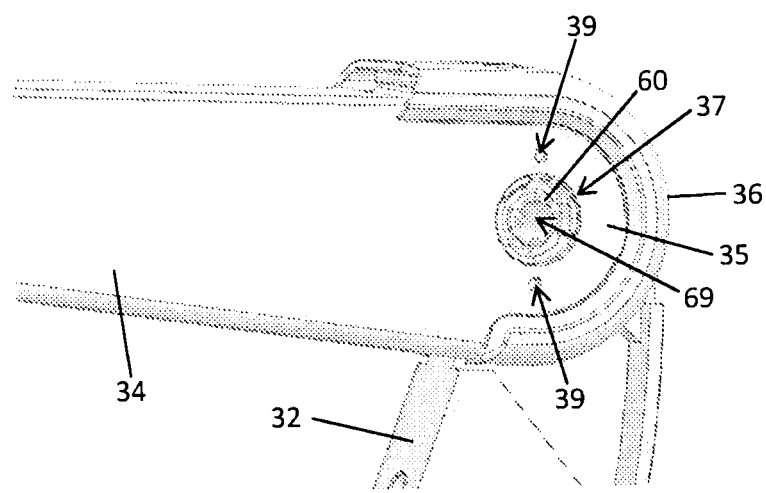
FIG. 12 is a perspective view as in FIG. 11, shown with the friction ring of FIG. 5 inserted for further assembly of the pivoting joint.

After placement of the armrest 34 as shown in FIG. 11, installation of the friction mechanism 10 further proceeds as shown in FIG. 12 with the first end 64 (FIG. 5) of the friction ring 60 inserted through the hole 37 defined in the pivot block 25 of the armrest 34 and into the interior 52 of the spacer 40. The inwardly directed first fingers 72 of the friction ring 60 contact the flange 44 of the spacer 40 at full insertion. As shown in FIG. 11, the second fingers 74 are directed into the hole 37 of the armrest. A friction ring 60 as shown in FIG. 12 is to be inserted at each side of the armrest 34, such that two friction rings 60 are installed for assembly of the friction mechanism 10 (FIG. 1). The first and second fingers engage the circular interior wall of the hole 37 with designed interference, with the fingers being flexed or deformed radially inward to be received within the hole 37. The friction rings 60 snap lightly into place and lightly engage the respective pivot blocks 35 and thus remain in place once inserted as assembly of the friction mechanism continues.

After insertion of the friction rings 60 as shown in FIG. 12, the bushing 28 (FIG. 6, FIG. 8) is inserted via either the first-side friction ring or second-side friction ring. The bushing 28 in the final installation resides between the collar 84 of the first cap 80 and the collar 94 of the second cap 90. The bushing 28 can be inserted from either side of the installation.

After insertion of the friction rings 60 as shown in FIG. 12, installation of the friction mechanism 10 further proceeds with installation of the first cap 80 and second cap 90. FIG. 13 illustrating the first cap 80 represents the installation of the two caps, each at its respective side of the friction mechanism 10 (FIG. 1). Upon placement of the first cap 80 as shown in FIG. 13, the collar 84 (FIG. 6) is inserted into the central hole 69 (FIG. 5) of the first-side friction ring 60 via the second end 66 of the body 62. To assure non-rotational engagement of first cap 80 with the corresponding side of the armrest 34, the posts 83 that extend from the plate 82 (FIG. 6) are inserted into registration holes 39 defined in the outward side of the pivot block 35 of the armrest (FIG. 11). Similarly, upon placement of the second cap 90, the collar 94 (FIG. 7) is inserted into the central hole of the second-side friction ring 60, and the posts 93 that extend from the plate 92 are inserted into corresponding registration holes defined in the other-side pivot block.

To secure the caps and other components of the friction mechanism 10, the bolt 20 is inserted via the hole 86 through the first cap 80 to permit the threaded end 26 of the bolt 20 to engage the internally threaded hole 96 in the collar 94 of the second cap 90. FIG. 14 is a cross-sectional view of the assembled pivoting joint 30, including the spreader 32, the armrest 34, and the friction mechanism 10. The head 22 of the bolt can be turned at the first side 16 of the friction mechanism 10 to tighten the engagement to a preferred tension or torque. Upon tightening, the bolt 20 draws the first cap 80 and second cap 90 together. The bushing 28, which is trapped on the shank of the bolt and abutting the inwardly directed collars of the caps, prevents the friction mechanism 10 from over-clamping and seizing the pivoting joint 30.

The fingers of the friction rings 60 may be deformed upon full assembly of the friction mechanism 10, particularly upon tightening of the bolt 20 as the first cap 80 bears force upon the first-side friction ring 60 and the second cap 90 bears force upon the second-side friction ring 60.

As shown in FIG. 14, the spacers 40 and friction rings 60 isolate the pivot blocks 35 of the armrest 34 from contacting the mounting plate 102 of spreader 32. The spacers 40 and friction rings 60 are non-rotationally engaged with the spreader 32. Thus, in the pivoting joint 30 as assembled, the spreader 32 is isolated from relative movements of the inward faces of the pivot blocks 35 during use in which the armrest 34 may be lowered and raised several times by each passenger occupying a seat. The condition of the spreader 32 is thus preserved. As the armrest 34 is raised and lowered by pivoting movement, relative movement in the pivoting joint 30 occurs between the armrest and friction mechanism 10. In particular, the armrest 34 rotates relative to the spacers 40 and friction rings 60, whereas the caps 80 and 90 are non-rotationally engaged with the armrest 34 and thus rotate therewith as the position of the armrest is adjusted.

The friction mechanism 10 thus provides sufficient friction to maintain the armrest 34 in a raised or partially-raised position while permitting a user to overcome the friction when adjustment of the armrest is intended. The friction mechanism 10, over many uses, will experience wear and the friction of an installed mechanism will reduce over time from the engineered friction level of a newly installed mechanism. Wear is expected to occur where relative movement occurs.

Relative movement in the pivoting joint 30 occurs between the spacers 40 and pivot blocks 35 of the armrest 34. The friction mechanism 10 provides resistance by friction due in part to the frictional engagement of the flanges 44 of the spacers with the pivot blocks 35.

Relative movement occurs between the pivot blocks 35 and the friction rings 60. The friction mechanism provides resistance by friction, due in further part to the frictional engagement of the fingers 72 and 74 with the circular interior wall of the hole 37.

Relative movement also occurs between the caps 80 and 90 and the friction rings 60, particularly at the access ends 66 (FIG. 5) where the second fingers 74 of the friction rings 60 frictionally engage the caps. Wear is thus expected to accumulate upon the friction rings 60 and spacers 40 to greater degrees that upon the armrest 34. Wear is also expected to accumulate upon the friction rings 60 to a greater degree than that upon the caps 80 and 90, according to the materials used in the construction of the friction mechanism 10.

When the friction mechanism 10 is to be replaced, the worn mechanism 10 is removed by a process in reverse order with respect the installation described with reference to FIGS. 9-13. The installation of a replacement mechanism can then be made without removal of a host structure, such as the spreader 32 in the illustrated example, from its in-use environment. Some or all of the friction mechanism 10 may be replaced, with emphasis on replacing the friction rings 60 when sufficient, and the spacers 40 if needed. In some examples the first cap 80, the second cap 90, the bushing 28, the bolt 20, and the spacers 40 may be utilized across several or many replacements of the friction rings 60.

The friction rings 60 can be conveniently replaced by removal of the bolt 10 and caps 80 and 90, followed by removal of worn friction rings 60, insertion of new friction rings 60, and reinstallation of the caps and bolt. Replacement of the friction rings 60 is expected to return the performance of the friction mechanism 10 to an engineered resistance to movement and thus renewed satisfactory function of a pivoting element exemplified by the armrest 34. Advantageously, the friction rings 60 can be replaced without dismounting a pivoting element from a host structure.

The spacers 40 and friction rings 60 can be made of plastic so as to provide a wearable part that can be replaced cost-efficiently. For example, the spreader can be constructed of metal, such as machined aluminum, and the armrest pivot blocks can be die-cast aluminum with secondary machining.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An externally replaceable friction mechanism, comprising:
   a first spacer configured to non-rotationally engage a fixed element and frictionally engage a pivoting element pivotable relative to the fixed element;
   a first friction ring configured to non-rotationally engage the first spacer, the first friction ring including fingers configured to frictionally engage the pivoting element; and
   wherein the first friction ring is configured to permit pivoting movement of the pivoting element relative to the fixed element and provide friction against the pivoting movement;
   wherein the first spacer includes a flange that is substantially perpendicular to an axis about which the first friction ring is configured to permit pivoting movement of the pivoting element relative to the fixed element, the flange configured to frictionally engage the pivoting element; and
   wherein the first spacer includes a neck connected to the flange, the neck having an exterior for non-rotationally engaging the fixed element, and an interior surrounding the axis for non-rotationally engaging the first friction ring.

2. The externally replaceable friction mechanism of claim 1, wherein the pivoting element is an armrest and the fixed element is a seat frame element, and wherein the friction mechanism further comprises a first cap configured to non-rotationally engage the armrest and frictionally engage the first friction ring, wherein the first friction ring is configured to permit pivoting movement of the first cap with the armrest.

3. The externally replaceable friction mechanism of claim 1, wherein the neck extends as a hexagonal wall having exterior facets to non-rotationally engage the seat frame element and having interior facets to non-rotationally engage the first friction ring.

4. The externally replaceable friction mechanism of claim 1, the first friction ring comprising a body extending along an axis about which the first friction ring is configured to permit pivoting movement of the pivoting element relative to the seat frame, the body including:
   a hexagonal first end for non-rotationally engaging the first spacer, the hexagonal first end extending beyond the fingers; and
   a second end opposite the first end, the second end overlapped by at least one of the fingers.

5. The externally replaceable friction mechanism of claim 4, wherein the fingers comprise:
   multiple first fingers each inclined toward the first end; and multiple second fingers inclined toward the second end.

6. The externally replaceable friction mechanism of claim 5, wherein the first fingers and second fingers are alternatingly spaced at regular angular intervals around the axis.

7. The externally replaceable friction mechanism of claim 6, wherein the first fingers and second fingers are connected to an exterior of the body along a circumferential path around the exterior of the body.

8. The externally replaceable friction mechanism of claim 1, further comprising:
   a second spacer configured to non-rotationally engage the fixed element and frictionally engage the pivoting element; and
   a second friction ring configured to non-rotationally engage the second spacer, the second friction ring including fingers configured to frictionally engage the pivoting element.

9. The externally replaceable friction mechanism of claim 8, wherein:
   the first spacer includes a first flange and a hexagonal first neck connected to the first flange, the first neck extending toward the second spacer;
   the second spacer includes a second flange and a hexagonal second neck connected to the second flange, the second neck extending toward the first spacer;
   the first friction ring has a hexagonal first end for non-rotationally engaging an interior of the hexagonal first neck; and
   the second friction ring has a hexagonal second end for non-rotationally engaging an interior of the hexagonal second neck.

10. The externally replaceable friction mechanism of claim 8, wherein:
    the first spacer and second spacer are symmetrically positioned and oriented relative to each other about a center plane; and
    the first friction ring and second friction ring are symmetrically positioned and oriented relative to each other about the center plane.

11. An armrest assembly, comprising:
    a seat frame element;
    an armrest pivotally connected to the seat frame element; and
    a friction mechanism pivotally connecting the armrest to the seat frame element,
    the friction mechanism, comprising:
    a first spacer configured to non-rotationally engage the seat frame element and frictionally engage the armrest; and
    a first friction ring configured to non-rotationally engage the first spacer, the first friction ring including fingers configured to frictionally engage the armrest:
    wherein:
    the first friction ring is configured to permit pivoting movement of the armrest relative to the seat frame element and provide friction against the pivoting movement;
    the first spacer includes a flange that is substantially perpendicular to an axis about which the first friction ring is configured to permit pivoting movement of the armrest relative to the seat frame element, the flange configured to frictionally engage the armrest; and
    the first spacer including a neck connected to the flange, the neck having an exterior for non-rotationally engaging the seat frame element, and an interior surrounding the axis for non-rotationally engaging the first friction ring.

12. The armrest assembly according to claim 11, wherein the first friction ring is in non-rotational engagement with the seat frame element via the spacer.

13. The armrest assembly according to claim 11, wherein the fingers frictionally engage a circular interior wall of a hole defined in the armrest.

14. A kit of parts for servicing a friction mechanism pivotally connecting an armrest to a seat frame element, the kit of parts comprising:

a first spacer configured to non-rotationally engage the seat frame element and frictionally engage the armrest pivotable relative to the seat frame element; and a first friction ring configured to non-rotationally engage the first spacer, the first friction ring including fingers configured to frictionally engage the armrest;

wherein:

the first friction ring is configured to permit pivoting movement of the armrest relative to the seat frame element and provide friction against the pivoting movement;

the first spacer includes a flange that is substantially perpendicular to an axis about which the first friction ring is configured to permit pivoting movement of the armrest relative to the seat frame element, the flange configured to frictionally engage the armrest; and the first spacer includes a neck connected to the flange, the neck having an exterior for non-rotationally engaging the seat frame element, and an interior surrounding the axis for non-rotationally engaging the first friction ring.

* * * * *